_Patented May 25, 1943_

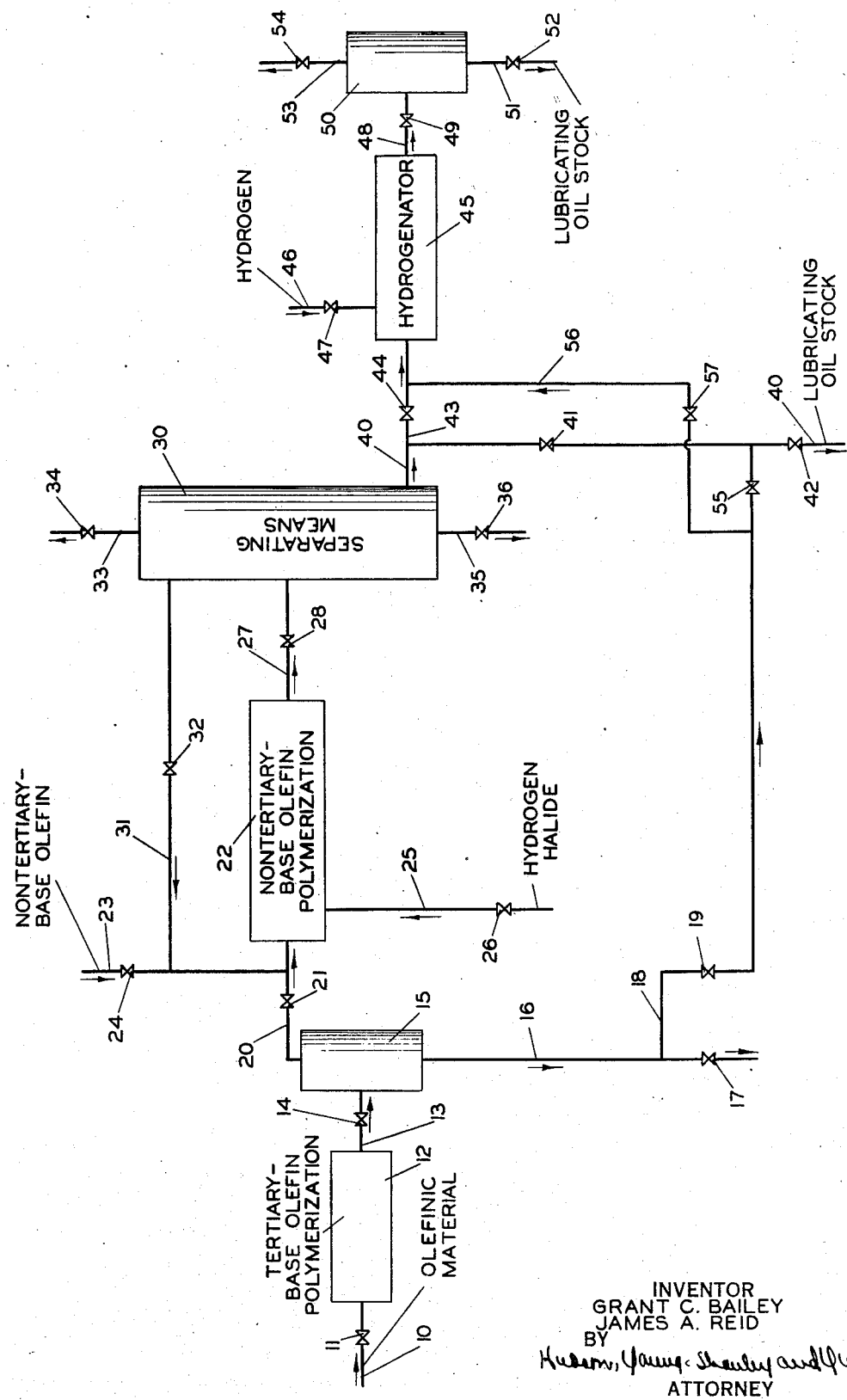

2,320,256

UNITED STATES PATENT OFFICE 2,320,256

POLYMERIZATION OF OLEFINS

Grant C. Bailey, Dewey, and James A. Reid, Bartlesville, Okla., assignors to Phillips Petroleum Company, a corporation of Delaware Application June 10, 1941, Serial No. 397,472

4 Claims. (Cl. 196—10)

This invention relates to the production of superior lubricating oils by the catalytic polymerization of olefins, and more particularly to the polymerization of selected olefins by means of promoted metal halide catalysts. It further relates to the production of an optimum yield of lubricating oil stock from a mixture of low boiling olefins.

The catalytic conversion of olefins to polymers in the viscosity range of lubricating oils is well known. The charge stocks for such processes are preferably mono-olefins, and include the normally gaseous or liquid olefins prepared by dehydrogenation of paraffins, dehydration of alcohols, cracking or dehydrogenation of waxes or gas oils, etc. The olefins may be used either singly or mixed with other olefins or inert diluents. The reactions may be effected over a wide range of temperature, but usually in the range of from −30° F. to 200° F. The active metal halides are preferred as catalysts such as aluminum chloride, zirconium chloride, boron fluoride, and the like, used either alone or in combination with various modifiers such as are well known.

It has already been recognized that in preparing polymers by various methods, as briefly outlined above, oils may be obtained having widely varying characteristics, depending markedly on both the olefin charge and the properties and conditions of the polymerization system. In practice, the charges used for the preparation of oils frequently contain a wide variety of olefin reactants, even though one type may be in predominance.

Although it has previously been proposed to polymerize olefins in the presence of an active metal halide polymerization catalyst together with a small amount of added hydrogen halide, whereby in general a more rapid polymerization is obtained, we have found that in many cases the polymers so obtained, especially in the viscosity range of lubricating oils, are quite inferior in one or more important physical characteristics to polymers prepared from the same charge stock using the same metal halide catalyst under the same conditions but in the absence of any hydrogen halide. We have further found that this is particularly true when the olefins polymerized are tertiary-base olefins, or when tertiary-base olefins comprising an appreciable portion of an olefinic hydrocarbon material which is being polymerized. However, we have also found that, although nontertiary-base olefins are only slowly polymerized in the presence of metal halide catalysts under conditions such that polymers suitable for use as lubricating oil stock are formed, such olefins may be rapidly polymerized to form polymers suitable for use as lubricating oil stock and having desirable physical characteristics when a small amount of a hydrogen halide is present provided that the nontertiary-base olefins are not only free of impurities such as diolefins, aromatic hydrocarbons, and nonhydrocarbon materials such as sulfur- or nitrogen-containing compounds, or the like, but are also substantially free of tertiary-base olefins. While we have found that this is true for nontertiary-base olefins in general, a preferable lubricating oil stock results from the polymerization of 1-olefins in the presence of a metal halide catalyst and a hydrogen halide. We have further found that, when a mixture of olefins is to be polymerized to form lubricating oil stocks, high yields of desirable products may be rapidly obtained by first polymerizing the tertiary-base olefins in the absence of any hydrogen halide, removing the polymers, and polymerizing unreacted olefins in the presence of a metal halide catalyst together with a hydrogen halide to produce polymers suitable for use as lubricating oil stock.

One object of this invention is to produce a lubricating oil base stock having superior qualities.

Another object is to polymerize olefins to products in the viscosity range of lubricating oils having high viscosity indexes.

Still another object is to polymerize selected olefins at a rapid, controlled rate.

Another object is to provide a superior catalytic conversion system for the production of desired oils from olefins.

Another object is to produce polymeric oils of relatively high thermal stability.

Other objects and advantages of our invention will be apparent from the accompanying disclosure and discussion.

The desired ultimate products within the conventional lubricating oil range have viscosities ranging from about 30 to about 200 seconds Saybolt viscosity at 210° F., although oils above and/or below this range may be useful for special purposes. The molecular weights of these desired products are normally greater than about 300 and less than 800, and generally they are less than 500, although products somewhat on either side of their limits may at times be found desirable. The primary product of our process is a simple olefin polymer, having one double bond per molecule, and for use as a component of lubricating oil it is generally desirable to increase its stability toward oxidation, as by non-destructive hydrogenation. The unhydrogenated product may be used as a lubricating oil as such, or may be blended with various other stocks to produce a composite lubricating oil. In some instances the process may be operated to produce olefinic products of somewhat lower molecular weight than that suitable for direct use as lubricating oil, and such olefinic products may be employed to alkylate aromatic hydrocarbons, such as benzene, or toluene, or their derivatives, to form hydrocarbons of suitable molecular weight and viscosity characteristics having also enhanced solvent characteristics, and the like. Olefinic products suitable for such additional treatment are included, along with products suitable for direct use as lubricants, in the broader considerations of our invention, and are to be included in the term lubricating oil stocks.

By tertiary-base olefins we intend to include all those olefins, which upon hydrolysis by an acidic medium will yield a tertiary alcohol. In general such olefins can be further defined as corresponding to the formula $R_2C=CR'_2$, where each R is any alkyl group and each R' is hydrogen or any alkyl group. As nontertiary-base olefins we intend to include not only straight-chain, or normal, olefins, but any branched-chain olefins which are not included in the above definition. Typical low-boiling tertiary-base olefins are isobutylene, 2-methyl-1-butene, 2-methyl-2-butene, 2-methyl-1-pentene, 2-methyl-2-pentene, 3-methyl-2-pentene, and the like. Typical low-boiling nontertiary-base olefins include ethylene, propylene, 1-butene, 2-butene, 1-pentene, 2-pentene, 3-methyl-1-butene, 3-methyl-1-pentene, 4-methyl-1-pentene, 4-methyl-2-pentene, any normal hexene or heptene, and the like. Ethylene and propylene are not as readily polymerized as some of the olefins of higher molecular weight, especially when they are not associated with olefins of higher molecular weight. The olefins may be polymerized singly or in mixtures of two or more. We find that the most desirable polymers suitable for use as lubricating oil stock are produced from the polymerization of individual 1-olefins.

In addition to molecular weight and viscosity limits and ranges, one of the most important characteristics of a lubricating oil is its viscosity index, a well known means of measuring and identifying the rate of viscosity change with change of temperature, an oil with a high viscosity index having a low rate of viscosity change with change of temperature, and it is with the production of lubricating oils having high viscosity indexes, or the production of lubricating oil stocks which will form lubricating oils with high viscosity indexes, that our invention is particularly concerned.

Although substantially all olefins are polymerized more rapidly in the presence of a metal halide catalyst when the corresponding hydrogen halide is present than when such hydrogen halide is not present, we have found that the polymerization products are in many cases quite different when a hydrogen halide is present. We have further found that, when the olefinic material to be polymerized contains large amounts of tertiary-base olefins, or consists of tertiary-base olefins, the lubricating oil stocks produced in the presence of a metal halide catalyst associated with a hydrogen halide have quite low viscosity indexes, so that they are not well suited for use as lubricating oil stocks, although they may be within a desired viscosity range and may have other special uses. We have also found that nontertiary-base olefins are only slowly polymerized in the presence of metal halide catalysts under conditions such as to give polymers suitable for use as lubricating oil stock, and that if such olefins are not associated with tertiary-base olefins they may be not only rapidly polymerized in the presence of a metal halide catalyst associated with a hydrogen halide but that the viscosity indexes of the polymers suitable for use as lubricating oil stocks are little, if any, lower than would be the case if these olefins had been polymerized in the absence of a hydrogen halide. Thus, we have found that if an olefinic charge stock contains both tertiary-base and nontertiary-base olefins, a rapid yield of desirable product can be obtained by first removing tertiary-base olefins and subsequently polymerizing remaining olefins in the presence of a metal halide catalyst and hydrogen halide. We have further found that if it is desired to convert substantially all the olefins of such a charge stock to polymers suitable for use as lubricating oil stock, the charge may be subjected to an initial polymerization in the presence of a metal halide catalyst and in the absence of a hydrogen halide to polymerize substantially all the tertiary-base olefins to form polymers suitable for use as lubricating oil stock, a reaction which proceeds with satisfactory rapidity and, subsequently, remaining olefins may be polymerized in the presence of a metal halide catalyst associated with a hydrogen halide to produce additional polymers suitable for use as lubricating oil stock.

Ideally, the tertiary-base olefin content of the stock polymerized in the presence of a metal halide and hydrogen halide will be zero. Actually, such complete removal is often impracticable and unnecessary. The deleterious effect of such olefins is roughly proportional to their concentration, so that in some cases essentially complete removal is necessary, while in others economic considerations may permit as much as several per cent of the olefinic material to be tertiary-base olefins. When it is stated that the olefinic material is freed of its content of tertiary-base olefins, such factors should be taken into consideration.

When it is not desired, or is impractical, to produce polymers suitable for use as lubricating base stocks from the tertiary-base olefin content of any particular charge, or in any particular instance, the tertiary-base olefins, and in some cases other types of reactive compounds, may be removed from the olefin mixture by any suitable means, which may include solvent extraction, such as with dilute sulfuric acid, by azeotropic distillation with added materials, by selective polymerization under known conditions in systems containing catalysts such as phosphoric acid, silica-alumina catalyst mixtures and the like, followed by separation of the desired olefins from the polymer, or by other means known to those skilled in the art. Valuable products, such as motor fuel stocks of high octane number, raw materials for chemical manufacture, and the like, may be produced from the tertiary olefins which are removed from the olefin mixture, or in the removal step.

The olefins charged to our process may, in some instances, be initially obtained in a relatively pure state by dehydration of the appropriate alcohols, dehydrogenation of the corresponding paraffins, depolymerization of olefin polymers, an initial polymerization step, or the like. On a commercial scale olefins are preferably obtained by dehydrogenation of paraffins, which may sometimes be noncatalytic, but which is more generally catalytic. Higher molecular weight olefins may be prepared either by thermal treatment of paraffins, resulting in the production of olefins most of which possess shorter carbon chains than the original paraffin, or by catalytic dehydrogenation of higher hydrocarbons with the formation of olefins having predominantly the same number of carbon atoms in the molecule as the original paraffins. Selected fractions of olefin-containing refinery products, such as the products from cracking stills, may also be used as charge stocks, especially after chemical treatment for the removal of objectionable components from the mixtures. Since the polymerization reaction is strongly exothermic it may be desirable to dilute the olefin with unreactive hydrocarbons in order to control the temperature and reaction rate more readily. Dilution may also be desirable to facilitate handling of the products.

As metal halide catalysts we include those known to the art, which may in general be classified as having low melting and/or boiling points and as evolving heat when dissolved in water, and among which are included aluminum chloride and bromide, boron fluoride and chloride, tin chloride, and zirconium chloride, as the more common. While these catalysts may be grouped or classified together, no one is to be considered the full equivalent of any other. The addition of a hydrogen halide with such a metal halide catalyst, in the practice of our invention, is primarily to increase the rate of reaction. Usually the hydrogen halide should contain the same halogen as the metal halide with which it is used. For example, hydrogen fluoride is preferably used with boron fluoride, and hydrogen chloride with aluminum chloride.

Some combinations of metal halides with hydrogen halides containing unlike halides react to produce materials of lower catalytic activity. For example, the addition of hydrogen fluoride to aluminum chloride produces a catalyst that is less active for the polymerization of olefins than aluminum chloride itself. Hydrogen iodide is not sufficiently stable to be generally useful. In specific cases mixtures of chlorides and bromides may be used. A compound which will produce or release a hydrogen halide under the conditions of the reaction may sometimes be used in place of a hydrogen halide, and such a modification is to be considered as within the scope of the invention.

It is preferred that the polymerization be carried out in liquid phase, and while higher pressures may be used, where an additional advantageous effect results, generally a pressure sufficient to maintain an initial liquid phase will be found sufficient. With lower-boiling olefins it may be desirable to include a higher boiling inert diluent to aid in forming and maintaining a liquid phase under relatively low pressures. Generally paraffins and cyclo-paraffins are best suited for such use.

The reaction temperature may be chosen within a rather wide range. Higher temperatures promote more rapid polymerization, but generally result in a product of lower molecular weight. A suitable temperature for any particular case may readily be determined by trial, by one skilled in the art, in the light of the present disclosure and discussion, and will generally be found in the range between about —30° F. and 200° F.

Our invention will now be illustrated in connection with the accompanying drawing which shows diagrammatically one arrangement of apparatus by means of which our invention may be practiced.

An olefinic material containing both tertiary-base and nontertiary-base olefins, and preferably previously purified to free it of nonolefinic reactive material, is introduced to the system through pipe 10 controlled by a valve 11 to polymerization unit 12, wherein the olefinic material is treated to remove therefrom tertiary-base olefins. This removal is preferably carried out by means of selective polymerization which may be under conditions suitable to produce low-boiling polymers, such as are suitable for use as motor fuel or as motor fuel stocks, or such as to produce polymers suitable for use as lubricating oil stocks, as previously discussed herein. The polymerization unit 12 will consist of suitable polymerization units together with heaters, coolers, catalyst chambers, and the like known to the art. The polymerization effluent containing unreacted nontertiary-base olefins passes through pipe 13 controlled by valve 14 to separating means 15. In separating means 15 the unreacted nontertiary-base olefins are separated from polymers produced in unit 12. These polymers may be removed with or without separation into various fractions, through suitable means represented by a pipe 16 controlled by a valve 17. When these polymers, or a fraction thereof, are suitable for use as a lubricating oil stock, such material may be passed from such a pipe 16 through a pipe 18 controlled by a valve 19 for blending with a lubricating oil stock produced in a subsequent part of the process, as will be described.

A material containing nontertiary-base olefins and substantially free of tertiary-base olefins, as herein discussed, is passed from separating means 15 through a pipe 20 controlled by a valve 21 to a polymerization unit 22 wherein a polymerization is effected to form polymers suitable for use as a lubricating oil stock. The olefins polymerized in unit 22 may be supplemented by nontertiary-base olefins added to the system through a pipe 23 controlled by a valve 24 passing to pipe 20, and in some instances olefins so added may constitute the sole source of olefinic material charged to the process. Polymerization in unit 22 is carried out in the presence of a metal halide polymeriation catalyst associated with a hydrogen halide which may be added through a pipe 25 controlled by a valve 26. The polymeriation conditions are such that an optimum yield of polymers suitable for use as a lubricating oil stock are produced as previously has been discussed, and the unit 22 will consist of suitable catalyst chambers, heaters, coolers, pumps, and the like as may be supplied for any particular case by one skilled in the art.

The effluent of unit 22 passes through a pipe 27 controlled by a valve 28 to separating means 30 illustrated diagrammatically by a fractionating column, and when the material passing through pipe 27 consists substantially only of hydrocarbons, the fractions recovered from the material may be separated by simple fractional distillation in one or more fractionating columns as may be readily ascertained by one skilled in the art. In some instances a mobile polymerization catalyst will be used in unit 22, and in such a case separating means 30 may also include suitable equipment for removal of the catalyst and any impurities contained in the material passing through 27, as may be suited to the particular material being treated. Unreacted olefins and/or low-boiling polymers may be removed from separating means 30 through a pipe 31 controlled by a valve 32, and returned for further reaction in unit 22 to pipes 23 and 20. Undesired low-boiling material, which may include paraffins, is discharged from the system through a pipe 33 controlled by a valve 34. Heavy hydrocarbons, tar and/or sludge may be discharged from the system through a pipe 35 controlled by a valve 36. One or more polymer fractions containing polymers suitable for use as lubricating oil stock are recovered from separating means 30 through one or more pipes illustrated by pipe 40 and may be discharged from the system through valves 41 and 42.

As previously discussed it is generally desirable to subject such polymers to further treatment which may include alkylation with aromatic hydrocarbons, saturation with hydrogen by nondestructive hydrogenation, or the like. Such further treatment will be illustrated by nondestructive hydrogenation, and when such a treatment is desired, any part or all of a polymer fraction suitable for a lubricating oil stock may be passed from pipe 40 through pipe 43 controlled by a valve 44 to a hydrogenator 45 wherein the polymer fraction is nondestructively hydrogenated in the presence of a suitable hydrogenation catalyst and in the presence of hydrogen added through pipe 46 controlled by a valve 47. A resulting saturated hydrocarbon material is passed through pipe 48 controlled by a valve 49 to separating means 50. A saturated hydrocarbon material suitable for use as a lubricating oil stock may be recovered from separating means 50 through pipe 51 controlled by valve 52, and any undesired material may be discharged from the system through a pipe 53 controlled by a valve 54.

When the polymerization in unit 12 is such as to produce polymers suitable for use as lubricating oil stock, such polymers may be blended with polymers produced in unit 22 to form a composite product of the two polymerization systems. When a polymer fraction is recovered without additional treatment, a polymer fraction passing through pipe 18 and valve 19 may be passed through valve 55 to pipe 40 and the composite lubricating oil stock recovered through valve 42. When it is desired to subject the polymer fraction passing through pipe 18 to subsequent treatment as by hydrogenation, such polymer fraction may be removed from pipe 18 through a pipe 56 controlled by a valve 57, and passed to pipe 43 and hydrogenator 45 for further treatment as previously discussed.

It is to be appreciated that the drawing just described is diagrammatic only. The various pieces of equipment illustrated and discussed are conventional in nature, and in any application of our invention there will be associated with the individual units shown various pumps, heaters, coolers, reflux accumulators, heat exchangers, fractionating columns, temperature indicating and control devices, and the like known in the art and which may be suitably supplied for any particular case by one skilled in the art following the teachings of the reaction conditions and material flows disclosed and discussed herein.

Our invention will be further illustrated by the following specific examples, which show various advantages of the invention but which are not necessarily to be construed as limiting the invention.

Example I

A pentane-pentene mixture obtained by fractionating the product resulting from the dehydrogenation of a pentane fraction of natural gasoline was found to have the following approximate composition:

| Component | Per cent |
|---|---|
| Pentanes | 60 |
| Tertiary pentenes | 10 |
| Pentene-1 | 10 |
| Pentene-2 | 20 |

This charge stock was polymerized by contacting it with aluminum chloride catalyst at a temperature of 100 to 120° F. A reaction time of approximately six hours was required to convert ninety per cent of the charge olefin to polymer. From the polymer a residue was obtained which had a viscosity of 67 seconds Saybolt at 210° F. and a viscosity index of 38.

Example II

In an effort to decrease the time of the reaction, the procedure of Example I was repeated, except that gaseous hydrogen chloride was added intermittently during the reaction. In this case, the polymerization was substantially completed in 1½ hours. However, the viscosity index of the oily residue, having a viscosity of 52 seconds Saybolt at 210° F., was found to be only 20, markedly lower than in the previous case.

Example III

The tertiary-base olefins and other readily converted materials were removed from a charge stock identical to that used in Examples I and II by contacting the hydrocarbon mixture at 80° F. with an aqueous solution containing 70 per cent by weight of sulfuric acid. The olefins in the remaining hydrocarbon mixture were polymerized using as catalyst aluminum chloride plus hydrogen chloride at 100 to 120° F. The reaction was substantially complete in 1½ hours. After separation of the lower-boiling polymer, the oily residue was found to have a viscosity index of 47 and a viscosity of 61 seconds Saybolt at 210° F.

These results showed the promoting effect of the addition of hydrogen chloride to the aluminum chloride catalyst system. In addition, the results demonstrated that promoter action may be secured without detrimental effect on the viscosity index of the resultant polymer by removing the most reactive materials, especially the tertiary-base olefins from the charge mixture.

In order to secure more definite information about these effects, purified olefins such as isobutylene, pentene-1 and hexene-1 were polymerized using metal halides such as aluminum chloride and zirconium tetrachloride, with and without hydrogen halides and hydrogen halide-producing materials, for example, water or tertiary butyl chloride.

We found that when purified isobutylene was polymerized under anhydrous conditions using aluminum chloride catalyst, polymer fractions in the viscosity range of lubricating oils possessed viscosity indexes of from 40 to 60. A similar polymerization was carried out in which hydrogen halide was present during the polymerization. Corresponding polymer fractions had viscosity indexes from −46 to +20. The details of reactions illustrating this effect are given in Examples IV and V.

*Example IV*

Purified isobutylene, substantially free from compounds of oxygen, sulfur and halogens, was polymerized in liquid phase at 140–185° F., using approximately one and one half per cent by weight of anhydrous aluminum chloride catalyst. The reaction mixture was vigorously stirred, while the temperature was controlled by external cooling. Approximately 95 per cent of the charge was converted to polymer during a four hour reaction period. The clear hydrocarbon product was decanted from the lower catalyst-sludge layer. Traces of catalyst were deactivated by bubbling ammonia into the liquid, which was then clarified by treating with adsorbent clay and filtering. The product was fractionated using reduced pressure. Twenty-eight per cent of the polymer product was in the viscosity range of lubricating oils. The properties of some of the fractions are given in Table I.

TABLE I

| Fraction | Saybolt viscosity at 100° F. | Viscosity index |
|---|---|---|
| 11 | 123 | 68 |
| 12 | 164 | 60 |
| 13 | 244 | 52 |
| 14 | 391 | 45 |
| 15 | 621 | 44 |
| 16 | 972 | 50 |

*Evample V*

In a repetition of the experiment cited in Example IV, hydrogen chloride was added intermittently during the reaction period. It was found on fractionation that about one-fifth of the product was in the viscosity range of lubricating oils. The viscosity data for some of the fractions are given in Table II.

TABLE II

| Fraction | Saybolt viscosity at 100° F. | Viscosity index |
|---|---|---|
| 8 | 112 | 20 |
| 9 | 183 | 4 |
| 10 | 368 | −6 |
| 11 | 1,070 | −48 |

When working with purified straight-chain olefins, especially the 1-olefins, it was found that the promoter effect of hydrogen halide on reaction rate was more pronounced than with tertiary-base olefins, and that the oily polymers possessed consistently high viscosity indexes. These results are illustrated by the following examples.

*Example VI*

Purified hexene-1 and 5 per cent of anhydrous zirconium tetrachloride were sealed in a glass bottle and agitated at room temperature for 5 days. The bottle was opened, the catalyst was removed by filtration, and the product was distilled. Approximately eight per cent of the charge had been converted to polymer during that extended reaction period.

*Example VII*

Approximately two per cent of anhydrous zirconium tetrachloride and six per cent of tertiary butyl chloride were added to purified hexene-1. This mixture was agitated by an effective stirrer. The polymerization proceeded rapidly, it being necessary to apply external cooling to maintain the reaction temperature between 86 and 95° F. The catalyst remained in suspension as a light brown powder and was readily filtered from the product at the end of the four hour reaction period. Approximately 90 per cent of the olefin had been converted to polymer, 70 per cent of which was in the viscosity range of lubricating oils. The viscosity indexes of the fractions are given in Table III.

TABLE III

| Fraction | Saybolt viscosity at 100° F. | Viscosity index |
|---|---|---|
| 5 | 119 | 92.5 |
| 6 | 169 | 88.5 |
| 7 | 228 | 99.0 |
| 8 | 1280 | 99.3 |

These results have demonstrated that in the polymerization of a charge stock containing a mixture of olefins, using metal halide catalysts plus a reaction promoter such as a corresponding hydrogen halide or materials that produce hydrogen halide under the conditions of the reaction, a superior product is obtained when the charge stock is treated to remove the tertiary-base olefins before polymerization. It has been found that the thermal stability of the resultant polymer is also increased through the removal of tertiary-base olefins from the charge mixture.

We claim:

1. An improved process for polymerizing a mixture containing tertiary-base and nontertiary-base olefins to form polymers suitable for use as lubricating oil stock, which comprises polymerizing said mixture in the presence of a metal halide catalyst and in the absence of a hydrogen halide to polymerize substantially only tertiary-base olefins to form polymers suitable for use as lubricating oil stock, removing polymers so formed, and polymerizing unpolymerized olefins of said mixture in the presence of a metal halide catalyst associated with a hydrogen halide to form aliphatic polymers suitable for use as a lubricating oil stock, and recovering also the last said polymers so produced.

2. An improved process for the production of hydrocarbons having a viscosity in the lubricating oil range and having a high viscosity index from a mixture of low-boiling olefins comprising substantial amounts both of tertiary-base and of nontertiary-base olefins, which comprises subjecting such a mixture to polymerization in the presence of an aluminum halide polymerization catalyst and in the absence of any hydrogen halide at a polymerization temperature such as to produce an optimum yield of polymers suitable for use as lubricating oil stock and for a time such as to effect substantially complete polymerization of said tertiary-base olefins and to leave a substantial amount of nontertiary-base olefins unreacted, removing from effluents of said polymerization polymers so formed, subjecting unreacted hydrocarbons, which are substantially free from polymers and from tertiary-base olefins, to polymerization in the presence of an aluminum halide polymerization catalyst and a hydrogen halide at a polymerization temperature such as to produce an optimum yield of polymers suitable for use as lubricating oil stock, and removing from effluents of the last said polymerization polymers so produced.

3. An improved process for polymerizing a mixture of low-boiling tertiary-base and nontertiary-base olefins to polymers in the lubricating oil range in the presence of a metal halide polymerization catalyst, which in the presence of a hydrogen halide promotes rapid polymerization of all olefins but which in the presence of a hydrogen halide produces from tertiary-base olefins polymers in the lubricating oil range of low viscosity index, which comprises subjecting such a mixture to the polymerizing action of such a metal halide polymerization catalyst in the absence of a hydrogen halide under polymerizing conditions of temperature and pressure to produce an optimum yield of polymers having a viscosity at 210° F. between about 30 and 200 seconds Saybolt and for a time such as to effect substantially complete polymerization of the tertiary-base olefins in said mixture and to leave a substantial amount of nontertiary-base olefins unreacted, removing from effluents of said polymerization polymers so formed, subjecting unreacted hydrocarbons, which are substantially free from polymers and from tertiary-base olefins, to polymerization in the presence of such a metal halide polymerization catalyst as aforesaid, together with a hydrogen halide at a polymerization temperature and pressure to produce an optimum yield of polymers having a viscosity at 210° F. between about 30 and 200 seconds Saybolt, and removing from effluents of the last said polymerization polymers so formed.

4. An improved process for the production of hydrocarbons having a viscosity in the lubricating oil range and having a high viscosity index, which comprises subjecting a $C_5$ hydrocarbon mixture containing substantial amounts of tertiary-base and nontertiary base pentenes to the polymerizing action of aluminum chloride in the absence of any hydrogen halide under polymerizing conditions of temperature and pressure to produce polymers in the lubricating oil range and for a time such as to effect substantially complete polymerization of the tertiary-base pentenes and to leave unreacted a substantial amount of nontertiary-base pentenes, removing from effluents of said polymerization polymers so formed, subjecting unreacted nontertiary-base pentenes recovered from said effluents to polymerization in the presence of aluminum chloride and hydrogen chloride under polymerizing conditions of temperature and pressure to produce polymers in the lubricating oil range, and recovering from effluents of the last said polymerization polymers so produced.

GRANT C. BAILEY.
JAMES A. REID.